(12) United States Patent
Thompson et al.

(10) Patent No.: US 9,346,381 B2
(45) Date of Patent: May 24, 2016

(54) VEHICLE SEAT WITH LOCKING APPARATUS

(75) Inventors: James Thompson, Down (GB); Seamus Mulholland, Armagh (GB)

(73) Assignee: Thompson Aero Seating Limited (GB)

( * ) Notice: Subject to any disclaimer, the term of this patent is extended or adjusted under 35 U.S.C. 154(b) by 294 days.

(21) Appl. No.: 13/978,014

(22) PCT Filed: Jan. 14, 2012

(86) PCT No.: PCT/EP2012/050534
§ 371 (c)(1),
(2), (4) Date: Oct. 10, 2013

(87) PCT Pub. No.: WO2012/095534
PCT Pub. Date: Jul. 19, 2012

(65) Prior Publication Data
US 2014/0084655 A1 Mar. 27, 2014

(30) Foreign Application Priority Data
Jan. 14, 2011 (GB) .................................. 1100604.6

(51) Int. Cl.
*B60N 2/42* (2006.01)
*B60N 2/06* (2006.01)
*B64D 11/06* (2006.01)

(52) U.S. Cl.
CPC .. *B60N 2/43* (2013.01); *B60N 2/06* (2013.01); *B60N 2/067* (2013.01); *B64D 11/06* (2013.01); *B64D 11/064* (2014.12)

(58) Field of Classification Search
CPC ............ B60N 2/43; B60N 2/06; B60N 2/067; B60N 11/06; B60N 11/064

USPC .................... 297/216.1, 344.1, 374
See application file for complete search history.

(56) References Cited

U.S. PATENT DOCUMENTS

| | | | | |
|---|---|---|---|---|
| 6,070,938 A * | 6/2000 | Elio | ......................... | 297/374 X |
| 6,312,052 B1 * | 11/2001 | Elio | ......................... | 297/344.1 |
| 7,748,778 B1 | 7/2010 | Udriste | | |

FOREIGN PATENT DOCUMENTS

| | | |
|---|---|---|
| DE | 37 07 750 A1 | 9/1988 |
| DE | 100 26 978 C1 | 10/2001 |

(Continued)

OTHER PUBLICATIONS

Notice of Allowance mailed Nov. 23, 2015 for U.S. Appl. No. 14/675,991.

(Continued)

Primary Examiner — Anthony D Barfield
(74) Attorney, Agent, or Firm — RatnerPrestia

(57) ABSTRACT

A vehicle seat has a carriage that moves linearly with respect to a base, and a locking apparatus for preventing unwanted movement of the carriage in the event of an emergency. The locking apparatus has first and second toothed components which inter-engage such that, during movement of the carriage with respect to the base, one of the first and second toothed components imparts movement to the other. A locking gear is engaged with the teeth of the first component for rotation thereby, and is movable into a locking state where it also engages with the teeth of the second component to prevent relative movement between the first and second components. The locking gear moves into the locking state in response to a decelerating force above a threshold level.

27 Claims, 4 Drawing Sheets

(56) References Cited

FOREIGN PATENT DOCUMENTS

| | | |
|---|---|---|
| DE | 10 2009 059126 A1 | 7/2010 |
| WO | 2012095534 | 7/2012 |

OTHER PUBLICATIONS

International Search Report issued in corresponding International Application No. PCT/EP2012/050534, mailed Jun. 1, 2012.

Written Opinion issued in corresponding International Application No. PCT/EP2012/050534, mailed Jun. 1, 2012.

GB Search Report issued in related GB Application No. 1406009.9, dated Sep. 12, 2014.

European Search Report mailed Aug. 17, 2015 in European Application No. 15162108.3.

Non-Final Office Action mailed Sep. 30, 2015 for U.S. Appl. No. 14/675,991.

\* cited by examiner

VEHICLE SEAT WITH LOCKING APPARATUS

RELATED APPLICATIONS

This is the U.S. National Phase entry of International Application No. PCT/EP2012/050534, filed Jan. 14, 2012, which claims the benefit of priority of Great Britain Application No. 1100604.6, filed Jan. 14, 2011. The contents of both applications are incorporated by reference herein for all purposes.

FIELD OF THE INVENTION

The present invention relates to movable vehicle seats, especially aircraft seats.

BACKGROUND TO THE INVENTION

Vehicle seats often include a mechanism that allows them to move back and forth, for example to adjust leg room or to facilitate reclining the seat. In the event of an accident, the forces acting on the seat, with or without a passenger, can cause unwanted and dangerous movement of the seat via the mechanism.

In a typical reclinable aircraft seat, the recline apparatus, which enables the movement of the seat from upright through recline to a bed position, comprises a movable upper carriage coupled to a fixed lower structure that is connected to the aircraft floor structure. At any position within its full range of movement the upper carriage may be stopped by the passenger, and must be securely retained against inadvertent movement. In the case of a manually operated recline apparatus this may be achieved by means of a system of spring-loaded teeth and slots similar to a manual car seat adjuster. If the recline motion is to be operated using a motor and reduction gear system, the force required to back drive the unpowered motor is normally sufficient to prevent movement of the carriage. Except for TTL (taxi, takeoff or landing) the loads that might cause the carriage to move are in the order of 1.5 G-2 G in a forward or aft direction. For TTL the loads that must be sustained are 9 G (static) or 16 G (dynamic) in the forward direction and 1.5 G in the aft direction.

It is desirable therefore to provide an apparatus for locking a vehicle seat with respect to its slide mechanism, and in particular for locking a seat's movable recline carriage with respect to a fixed lower structure, especially in the event of an accident.

SUMMARY OF THE INVENTION

From a first aspect the invention provides a vehicle seat, especially but not exclusively an aircraft seat, having a carriage that is linearly movable with respect to a base, and a locking apparatus comprising a first and a second component, each having a respective set of teeth inter-engaged such that, during movement of the carriage with respect to the base, one of said first and second toothed components imparts movement to the other via the respective teeth, and wherein a locking gear is engaged with the teeth of said first component for rotation thereby, and is movable into a locking state where it also engages with the teeth of said second component to prevent relative movement between the first and second components. The first component typically also comprises a rotatable gear, while the second component may comprise a rotatable gear, or a toothed rack or other toothed component.

One of said toothed components may be provided on the carriage, the other on the base. Alternatively, both toothed components may be provided on the base.

In typical embodiments, said carriage and said base are coupled together by a rack and pinion gear. Said rack may serve as said second toothed component, while said pinion gear may serve as said first toothed component. Alternatively, said pinion gear may serve as said second toothed component, and said first toothed component may comprise a further toothed gear intermeshed with both said pinion gear and said locking gear.

The rack may be provided on said carriage and the corresponding pinion gear may be provided on said base, in which case the pinion gear is rotatable about an axis that is fixed with respect to the base. Alternatively, the rack may be provided on said base and the corresponding pinion gear may be provided on said carriage, in which case the pinion gear is rotatable about an axis that is fixed with respect to the carriage.

In preferred embodiments, the locking apparatus comprises a first gear coupled to the pinion gear such that the first gear and pinion gear rotate, in use, in opposite senses, said locking gear being coupled to said first gear such that the locking gear and the first gear rotate, in use, in opposite senses, wherein the locking gear is movable between a non-locking state, in which it is disengaged from the pinion gear, and a locking state in which it intermeshes with the pinion gear to prevent rotation of the pinion gear. In embodiments where the rack is provided on the carriage, said first gear is rotatable about an axis that is fixed with respect to the base, and vice versa.

The locking apparatus is particularly intended for stopping relative movement of the carriage and base in the event of deceleration of the vehicle (preferably in its forward direction of movement) at a level above a threshold value. Hence, said locking gear is movable towards said locking state in response to force being exerted on said locking mechanism in a forward direction. More particularly, said locking gear is movable into said locking state in response to force above a threshold level being exerted on said locking mechanism in said forward direction. Said forward direction corresponds with the forward direction of movement of the vehicle and so said forward force may be caused by deceleration of the vehicle. Typically, said seat faces in said forward direction.

In the preferred embodiment, said first gear intermeshes with said pinion gear. Preferably still, said locking gear intermeshes with said first gear. Alternatively, one or more respective intermediate gears may be provided between said first and pinion gears and/or between said first and locking gears. Alternatively still, said first gear may also serve as said pinion gear, in which case said locking gear engages with said rack in the locking state.

Preferably, said locking gear is coupled to the locking apparatus by a link member, the locking gear being rotatably coupled to the link member and the link member being pivotable with respect to the locking apparatus to allow the locking gear to pivot between the locking and non-locking states. In the preferred embodiment, the link member couples the first gear directly to the locking gear, maintaining the intermeshing of the respective gears, and is pivotable about the rotational axis of the first gear.

The locking apparatus preferably is arranged to adopt its non-locking state under the influence of gravity. This may be achieved by positioning the locking gear and its pivot axis below the pinion gear. In preferred embodiments, the link member is configured to have a centre of gravity positioned such that the mass of the link member tends to cause a moment under gravity about the pivot axis of the link member that has an opposite sense to the moment caused by the mass of the locking gear under gravity.

The first gear is preferably located below and rearwardly of the pinion gear. The locking gear is preferably located below and forwardly of the first gear.

In preferred embodiments, either the first gear or the pinion gear is directly or indirectly coupled to the output shaft of a rotary actuator.

Preferably, resilient biasing means are provided to maintain the locking gear in said locking state and preferably also to urge the locking gear into said locking state. Said resilient biasing means may also be arranged to maintain said locking gear in the non-locking state, said bias being overcome in the event of said threshold force.

In typical embodiments, the seat is reclinable, said relative linear movement of the carriage and base corresponding to the seat being operated between reclined and non-reclined states. Alternatively, or in addition, the seat is movable forward and rearwards, said relative linear movement of the carriage and base corresponding to the seat being moved forward and rearward.

Other preferred features are recited in the dependent claims.

Further advantageous aspects of the invention will become apparent to those ordinarily skilled in the art upon review of the following description of a specific embodiment and with reference to the accompanying drawings

BRIEF DESCRIPTION OF THE DRAWINGS

Embodiments of the invention are now described by way of example and with reference to the accompanying drawings in which like numerals are used to denote like parts and in which.

DETAILED DESCRIPTION OF THE DRAWINGS

Figures 1, 2A, 2B, 2C:
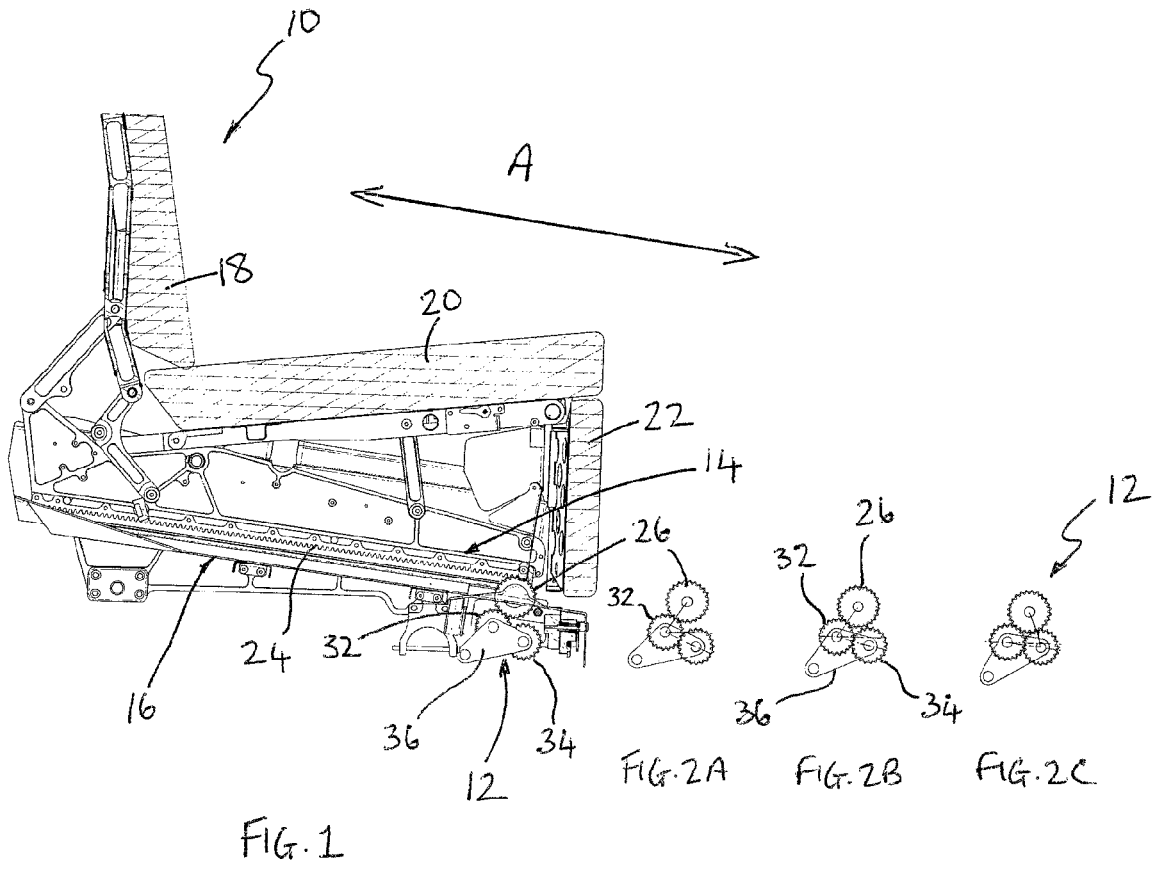
FIG. 1 is a sectioned side view of a reclinable seat including a locking apparatus embodying the invention.
FIGS. 2A to 2C show respective side views of the locking apparatus of FIG. 1 in an unlocked state, a clashed state and a locked state.

Referring now to FIG. 1 of the drawings there is shown, generally indicated as 10, a vehicle seat including a locking apparatus 12 embodying the invention. The seat 10 is reclinable between a non-reclined state (shown in FIG. 1) and a reclined state (not shown). The invention is particularly suitable for use with aircraft seats and so the illustrated seat 10 is an aircraft seat, shown in its TTL (taxi, takeoff or landing) state. Typically, in the reclined state, the seat 10 serves as a bed and, to this end, may provide a substantially horizontal sleeping surface. The seat 10 may adopt a plurality of semi-reclined states between the non-reclined state and the (fully) reclined state.

The seat 10 includes a carriage 14 that is movable with respect to a base 16. The base 16 is fixed to the floor of the aircraft (or other vehicle) by any suitable fixing means, e.g. bolts. The seat back 18, seat pan 20 and leg rest 22 are all carried by the carriage 14. The carriage 14 is movable substantially linearly with respect to the base 16, as indicated by arrow A in FIG. 1. Normally, this linear movement is substantially in the fore-and-aft direction of the vehicle, which in turn normally corresponds to the direction in which a seated passenger faces. A mechanism for facilitating relative movement between the carriage 14 and the base 16 is provided and preferably comprises a rack 24 and pinion, or gear 26, assembly. In the illustrated embodiment, the gear 26 is provided on, and its rotational axis is fixed with respect to, the base 16, and the rack 24 is provided on the carriage 14, although in alternative embodiments the gear 26 may provided on the carriage 14 and the rack 24 may be provided on the base 16. In either case, relative movement can be imparted between the carriage 14 and base 16 by inter-engagement of the respective teeth of the rack 24 and gear 26. Also in either arrangement, it is preferred to locate the gear 26 below the rack 24 (as illustrated), although it is possible to locate the gear 26 above the rack 24. Preferably, the gear 26 is located at the foremost end of the base 16, and therefore adjacent the foremost end of the carriage 14 when the seat 10 adopts its TTL position. Typically, movement of the carriage 14 relative to the base 16 is powered in which case the gear 26 is coupled (directly or indirectly) to the drive shaft of an actuator, preferably a rotary actuator, e.g. a motor (not shown), such that rotation of the drive shaft causes rotation of the gear 26 which in turn causes linear movement of the carriage 14 via the rack 24.

In alternative embodiments (not illustrated), the seat 10 need not necessarily be reclinable, in which case the carriage, base, rack, gear and, if required motor, may all be configured to facilitate fore-and-aft movement of the seat.

In normal, e.g. non-crash, situations, the resistive torque of the rotary actuator is sufficient to maintain the relative position of the carriage 14 and base 16. However, depending on the mass of the carriage 14 (or the combined mass of the carriage 14 and a passenger) it is possible, especially in the event of a crash, that the inertia of the carriage 14 might overcome the resistive torque of the rotary actuator. Should this occur the carriage would not be prevented from moving and the seat could be deemed to fail safety requirements.

The locking apparatus 12 is provided to selectively lock the position of the carriage 14 with respect to the base 16. As is described in more detail below, the locking apparatus 12 is configured to move from a non-locking state to a locking state in response to being subjected to a force that exceeds a threshold value. More particularly, the locking apparatus 12 is configured such that its inertia maintains it in the non-locking state, or at least out of the locking state, until a threshold-exceeding force is experienced whereupon the locking apparatus is caused to adopt the locking state. The locking apparatus 12 may therefore be described as an inertia locking apparatus. In typical embodiments, the force required to cause the locking apparatus 12 to adopt the locking state is created by deceleration of the vehicle exceeding a threshold value. In the typical case where the seat is facing forward in the direction of travel, i.e. in a forward longitudinal direction, the required deceleration is longitudinal and in the direction of travel. Hence, the locking apparatus 12 removes sensitivity to the carriage mass. More generally, the inertia of the locking apparatus 12 is such that it is responsive to forces of acceleration (where deceleration is negative acceleration), in particular linear acceleration, to maintain a non-locking state until a threshold level of acceleration is experienced whereupon it moves into the locking state, and wherein the activating forces are caused by acceleration or deceleration of the seat and more particularly of the vehicle.

The locking apparatus 12 comprises a first gear 32 rotatable about an axis that is fixed with respect to the base 16. In the preferred embodiment, the gear 32 is connected (directly or indirectly) to the output shaft of the rotary actuator and so is driven, typically directly driven although one or more other intermediate gears may alternatively be provided, by the rotary actuator. In the illustrated embodiment, the rotational axis of the gear 32 corresponds with the rotational axis of the output shaft of the rotary actuator, although it may alternatively be parallel with the rotational axis of the actuator when one or more intermediate gears are provided. The first gear 32 is intermeshed with the gear 26 such that rotation of the gear 32 causes rotation of the gear 26 but in the opposite sense.

The locking apparatus 12 further comprises a locking gear 34 rotatable about an axis that is parallel with the rotational axis of the gears 26, 32. The locking gear 34 is intermeshed with the driven gear 32 such that rotation of the driven gear 32 causes rotation of the gear 34 but in the opposite sense. The respective rotational axes of the gears 26, 32, 34 are parallel with one another and run substantially perpendicularly to the direction A, and usually perpendicular to the direction of movement of the vehicle.

In alternative embodiments, the gear 26 may be driven directly (or indirectly via one or more intermediate gears) by the rotary actuator, in which case rotation is imparted to the first gear 32 by the gear 26. In either case, the positions of the respective rotational axis of the gears 26, 32 are static with respect to the base 16. The position of the locking gear 34, and therefore its rotational axis, is variable and is maintained by a linking member 36, which is free to rotate or pivot about the rotational axis of the driven gear 32.

The locking gear 34 is coupled to the driven gear by the link member 36. The link member 36 holds the locking gear 34 intermeshed with the driven gear 32 and is configured to allow the locking gear 34 to pivot about the rotational axis of the driven gear 32. To this end, the link member 36 is pivotable about the rotational axis of the driven gear 32 and the locking gear 34 is rotatably coupled to the link member 26. As is described in more detail below, the locking gear 34 is pivotable about the rotational axis of the driven gear 32 at least in response to being subjected to forces caused by deceleration of the vehicle. The locking gear is pivotable between a non-locking state (FIGS. 2A and 3A) and a locking state (FIGS. 2C and 3D) in which the locking gear 34 intermeshes with the gear 26. The locking state of the gear 34 corresponds to the locking state of the locking apparatus 12. The link member 36 may for example comprise a single plate or bracket located on one side of the gears 32, 34, or may comprise two spaced apart plates or brackets, one located on either side of the gears 32, 34, or may comprise any other suitable component or assembly of components.

Advantageously, the link member 36 is configured to have a centre of gravity that is positioned such that the mass of the link member 36 tends to cause a moment under gravity about the rotational axis of the driven gear 32 that has an opposite sense to the moment caused by the mass of the gear 34 under gravity. The weight of the link member 36 may therefore be said to counterbalance the weight of the gear 34 about the rotational axis of the driven gear 32. This facilitates maintaining the gear 34 in a preferred position when in the non-locking state and also helps move the gear 34 into engagement with the gear 26 in the event of deceleration as is described in more detail below. The link member 36 has a counterweight portion 38 extending in a generally opposite direction with respect to the driven gear 32 axis than does the portion that carries gear 34 and, as such, extends rearwardly from the rotational axis of the gear 32 in the illustrated embodiment.

In the preferred embodiment, the driven gear 32 is located below and rearwardly of the gear 26. In this embodiment, the rearward direction corresponds with the direction in which the carriage 14 moves when the seat 10 is moved from its reclined or a semi-reclined state towards the non-reclined state, the forward direction being the direction in which the carriage 14 moves when the seat 10 is moved from its non-reclined state to the reclined state or a semi-reclined state. The forward direction corresponds with the direction of forward movement of the vehicle and so it is assumed in this example that the seat 10 faces forwardly. Preferably, the locking gear 34 is located below and forwardly of the driven gear 32. Conveniently, this is facilitated by the action of the counterweight portion 38. The link member 36 is preferably also substantially below the axis of the driven gear 32. In alternative embodiments, the driven gear 32 may be located above and rearwardly of the gear 26, the locking gear 34 preferably being located above and forwardly of the driven gear 32.

Figures 3A, 3B, 3C, 3D:
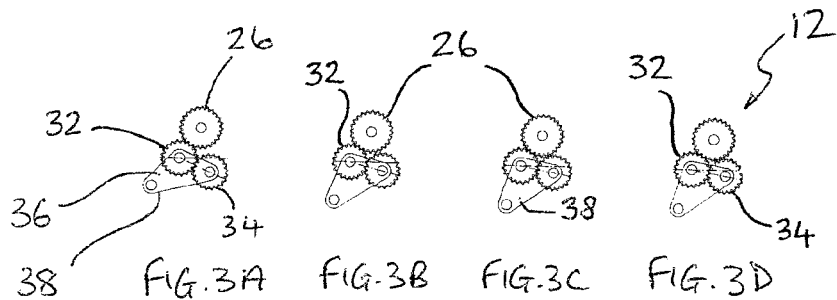
FIGS. 3A to 3D show respective side views of the locking apparatus of FIG. 1 as the locking apparatus moves from the unlocked state to the locked state.

Referring in particular to FIGS. 2A and 3A, the locking apparatus 12 is shown in its non-locking state in which the locking gear 34 is not engaged with the gear 26. The locking apparatus 12 is configured to adopt the non-locking state under the influence of gravity, and when subjected to forces resulting from acceleration or deceleration of the vehicle during normal use, e.g. during take off, taxiing, landing or normal flight of an aircraft. In these circumstances, the locking gear 34 is held in position by the weight of the locking gear 34 (counterbalanced by the weight of the link member 36 in the preferred embodiment) acting forwardly of the rotational/pivotal axis of the link member 36. The exact position of the locking gear 34 in the non-locking state may vary depending on the activity of the vehicle.

When the seat 10, and therefore the locking apparatus 12, is subjected to a threshold-exceeding force in the forward direction, especially a force caused by deceleration of the vehicle exceeding a threshold value (as may occur during an accident or emergency situation), the combined mass of the locking gear 34 and the link member 36 generate a torque, or moment, about the rotational axis of the link member 36 that counteracts and overcomes the weight, or inertia, of the locking gear 34, causing the locking gear 34 to move towards a position where it engages with the pinion gear 26 and, more particularly, intermeshes with the pinion gear 26 provided the respective teeth of the gears 34, 26 are positioned relative to one another to allow intermeshing. When the locking gear 34 is intermeshed with the gear 26, the gear 26 is prevented from rotating further since its direction of rotation is opposed by the direction of rotation of the locking gear 34. The arrangement is such that the deceleration required to move the locking gear 34 is much less than that required to overcome the resistance of the rotary actuator and cause the gears 26, 32 to rotate due to movement of the carriage 14. Hence, the locking state is adopted before the carriage 14 can move. This may form example be arranged by appropriate selection of the combined mass of the gear 34 and link member 36 and advantageously the shape and configuration of the link member 36.

Referring now in particular to FIGS. 3A to 3D, an example of the operation of the locking apparatus 12 is described. FIG. 3A shows the locking apparatus 12 in its non-locking state in which the locking gear 34 is disengaged from the gear 26. The exact position of the gear 34 in the non-locking state is variable and depends on the equilibrium position adopted by the link member 36 and gear 34 when acted on by gravity alone together with the affects of any forces that may be present due to acceleration or deceleration of the vehicle. In FIG. 3A, zero acceleration of the vehicle is assumed in which case the locking gear 34 adopts its equilibrium position under the influence of gravity alone. FIGS. 3B to 3D show progressively the locking gear 34 moving towards and into engagement with the gear 26 in response to deceleration of the vehicle. By way of example only, FIG. 3B shows the gear 34 rotated through an angle of 10° from equilibrium towards the locking state, FIG. 3C shows the gear 34 rotated through an angle of 13° from equilibrium towards the locking state, and FIG. 3D shows the gear 34 rotated through an angle of 14° from equilibrium into the locking state 13°. It will be understood that these angles are not limiting to the invention.

In FIG. 3B, the teeth of the locking gear 34 can still rotate past those of the gear 26 and so the locking state has not been reached. In this example, the state shown in FIG. 3B is assumed to occur between the non-locking and locking states although it could also occur if the experienced deceleration was insufficient to cause the locking gear 34 to reach the locking state (in which case the gear 34 would move away from the gear 26 when the deceleration decreased). In FIG. 3C, the locking gear's teeth have entered the spaces between the teeth of the gear 26, but the depth of engagement is not sufficient to prevent rotation of the gear 26. In this example, the state shown in FIG. 3C is assumed to occur between the non-locking and locking states although it could also occur if the experienced deceleration was insufficient to cause the locking gear 34 to reach the locking state (in which case the gear 34 would move away from the gear 26 when the deceleration decreased). In FIG. 3D, there is sufficient depth of engagement of the gears' teeth to prevent significant movement of the gear 26. Hence, the locking state has been reached. This occurs when the force exerted on the locking apparatus 12 in the forward direction exceeds a threshold value. In this example, it is assumed that this occurs when the vehicle decelerates at a level above a threshold value. Depending on the load exerted by the rotary actuator, the interaction between the intermeshed gears 26, 34 may maintain them in their intermeshed state, i.e. maintain the locking state. The interaction of the intermeshed gears 26, 34 tends to maintain the locked state due to the directions of rotation/moment about each gear axis, which tends to increase the meshing force on the gears 26, 34. If the direction of movement of the carriage or the motor rotation were reversed the gears would tend to disengage.

Preferably, resilient biasing means, e.g. one or more springs, are provided to maintain the locking gear 34 in the locking state. The resilient biasing means may also be arranged to assist movement of the locking gear 34 into the locking state (see FIGS. 4 and 5).

The locking gear 34 may return to its unlocked state under the influence of gravity when the crash load levels decrease to less than the threshold value. The exact load at which this change will take place depends on the force exerted by the biasing spring(s), when present. The preferred locking apparatus 12 tends toward a fail-safe condition where it is possible that the apparatus 12 may remain locked after the crash load has been removed completely due to the force of the biasing spring(s). In this case the locking gear 34 may be manually disengaged Referring in particular to FIG. 3C, there is shown a situation where, upon initial engagement of the gears 26, 34, the tips of their respective teeth are aligned such that they clash with one another to prevent intermeshing of the gears 26, 24. In such an event, if the level of deceleration continues to increase to the point where the rotary actuator resistance is overcome by the forces acting on the carriage 14, the carriage will move causing the gears 26, 32 to rotate and allow the teeth of the gears 26, 34 to intermesh, causing the locking state to be adopted and preventing further movement of the carriage 14.

Figure 4A:
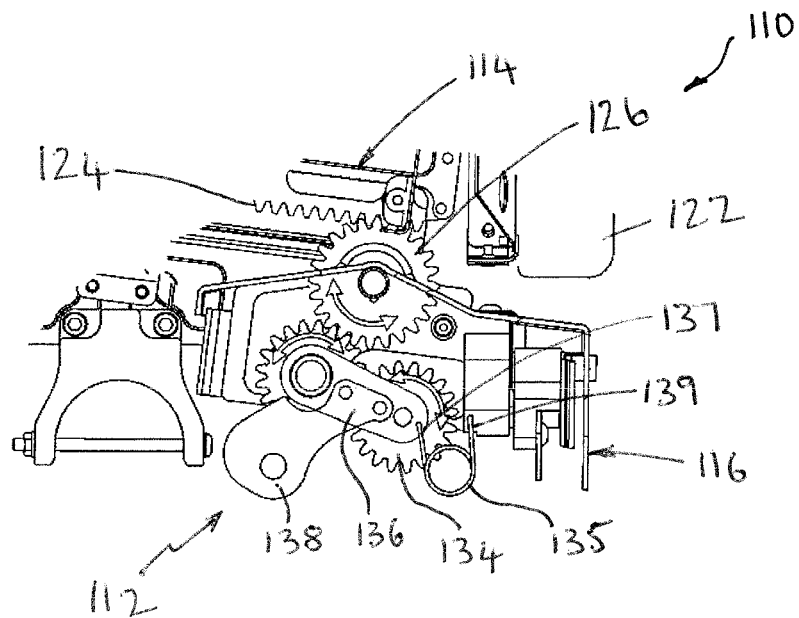
FIGS. 4A to 4D show respective side views of a more detailed embodiment of the locking apparatus as the locking apparatus moves from the unlocked state to the locked state.
Figure 4B:
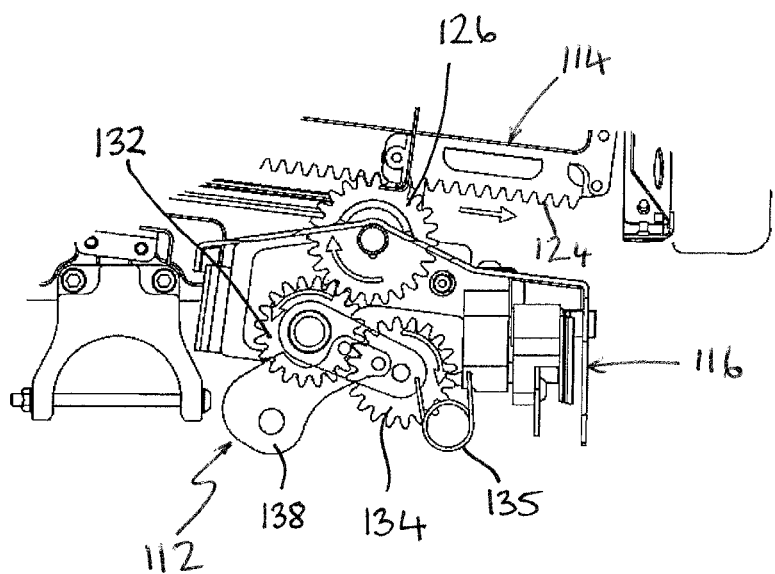
Figure 4C:
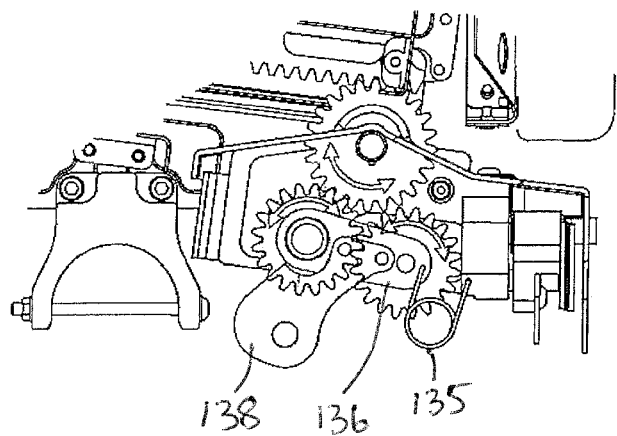
Figure 4D:
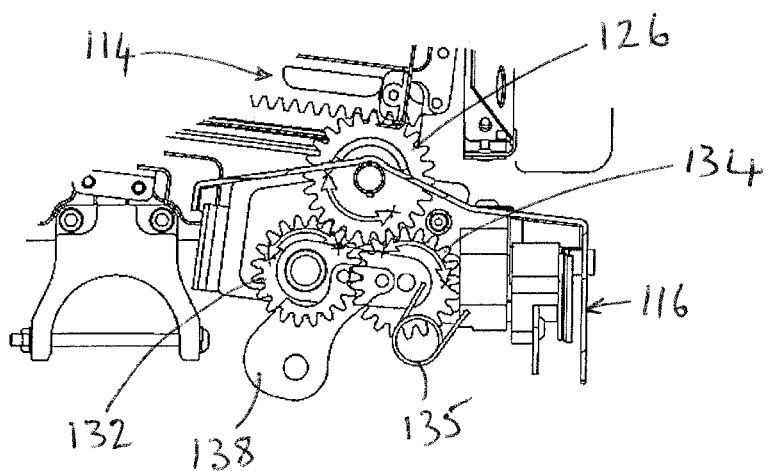
Figure 5:
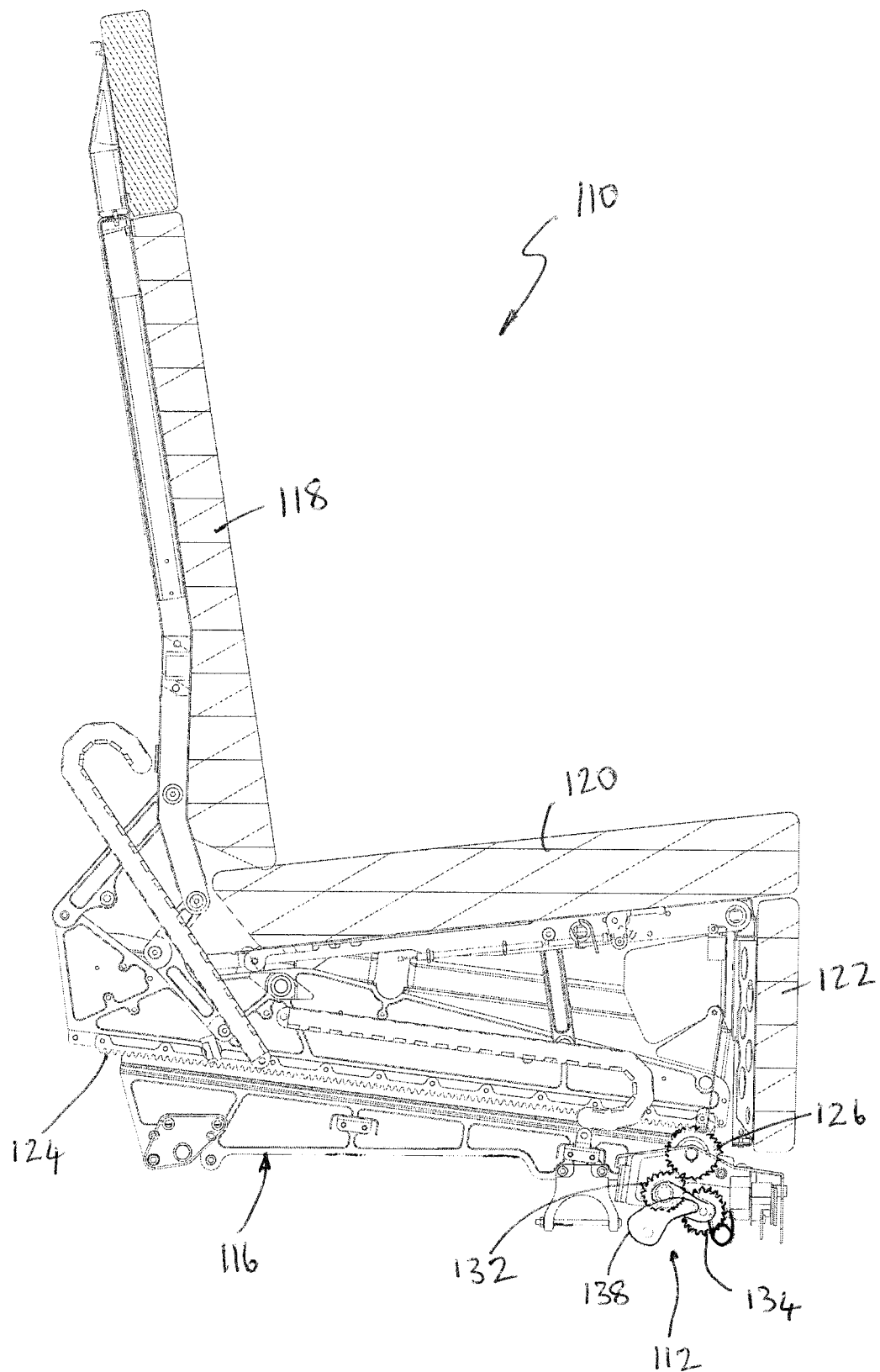
FIG. 5 shows the locking apparatus of FIG. 4 incorporated into a reclinable seat.

Referring now to FIGS. 4 and 5, an embodiment of the locking apparatus 112 is shown in more detail. The locking apparatus 112 is substantially the same as the locking apparatus of FIGS. 2 and 3, and so like numerals are used to denote like parts and the same description applies as would be apparent to a skilled person.

FIG. 4A shows the locking apparatus 112 in situ in an initial non-locking state with the seat 110 in its TTL position at rest, with the locking gear 134 held at its low (disengaged) position by gravity and by the force of a resilient biasing member in the preferred form of a spring 135. The biasing spring 135 is coupled between the base 116 and the locking gear 134, one end conveniently being connected to the link 136, the other connected to a fixed component of the base 116. The preferred spring 135 is a torsion spring set with its ends 137, 139 compressed together such that they would open (move further apart) if free. The line of action of the force due to the spring 135 runs below the axis of rotation of the locking gear 134 and linking member 136 about the first (actuator) gear 132, tending to maintain the unlocked position against the effects of "normal" operation of the vehicle/aircraft.

FIG. 4B shows the locking apparatus 112 still unlocked but with the carriage 114 moved forward by translation of the rack 124 (e.g. as a result of a passenger reclining the seat 110), unimpeded by the locking gear 134.

FIG. 4C, shows the locking apparatus 12 under the influence of a forward crash load (aft inertia vector), assuming that the seat 110 is facing forwards. In this case the inertial effect of the masses of the locking gear 134, the linking member 136 and any attached counterbalance weight 138, generates a counter-clockwise (as viewed in FIG. 4C) moment about the axis of the first (driven) gear 132, causing the locking gear 134, the linking member 136 and counterweight 138 to rotate in that direction bring the locking gear 134 closer to engagement with the third gear 126. One purpose of the counterweight 138 is to prevent reduction in the turning moment as the height of the locking gear 134 approaches that of the axis of the driven gear 132. In the position shown in FIG. 4C the line of action of the biasing spring 135 has moved so that it is just above the rotation axis of the linking member 136 about the driven gear 132, and is therefore tending to urge the locking gear 132 towards gear 126.

FIG. 4C also illustrates that the initial meshing of the locking gear 134 and gear 126 may be prevented by the clashing position of their teeth. If the crash load does not rise to a point where the resistance of the actuator is overcome, the system is still safe. The biasing spring 135 and the inertial effect of the counterbalance 138 urge the locking gear 134 towards engagement with gear 126 and, as soon as there is movement of the actuator due to further increasing crash load, the teeth of the locking gear 134 and gear 126 will move to a position where meshing is possible.

FIG. 4D shows the locking apparatus 112 after meshing of the driven gear 132, the locking gear 134 and gear 126 has been achieved. In this position the line of action of the biasing spring 135 is above the rotation axis of the driven gear 132, helping to maintain the locked position. The tendency for the carriage 114 to move forward also tends to rotate gear 126 clockwise (as viewed in FIG. 4D), which in turn tends to rotate the normally driven gear 132 counter-clockwise. These rotations both tend to draw the locking gear 134 towards the other gear pair and it can easily be seen that the reverse movement would tend to move the locking gear 134 away from its locked position.

In alternative embodiments (not illustrated), any suitable actuator, e.g. a linear actuator, may be used to recline the seat rather than a rotary actuator, in which case none of the gears of the locking apparatus, or coupled to the gears of the locking apparatus, are driven directly or in directly by rotary drive means. For example, the carriage may be driven by a linear actuator, in which case rotational movement would be imparted to the gears via the rack. Alternatively still, the seat recline mechanism may be manually driven, e.g. by a passenger, rather than by a powered actuator.

In alternative embodiments (not illustrated), the locking apparatus 12, 112 may be provided on the moveable carriage rather than the base, in which case the position of the rotational axis of the gear 32, 132, and the intermediate gear 26, 126 (if present), would be fixed with respect to the carriage. In such embodiments the rack 24, 124 is typically provided on the base 16, 116.

In alternative embodiments, the intermediate gear 26, 126 may be omitted and the gears 32, 132, 34, 134 may each interact directly with the rack 24, 124. The operation of the locking mechanism in such embodiments is substantially the same as that described above, although, in the locked state, the locking gear 34, 134 engages with the rack and the first (optionally driven) gear 32, 132 to lock the carriage in position.

More generally, locking apparatus embodying the invention comprise a first and a second component, each having a respective set of inter-engagable teeth, one component being provided on the carriage, the other on the base, such that the respective sets of teeth inter-engage, and such that, during movement of the carriage with respect to the base, one of said first and second components imparts movement to the other via the respective teeth, and wherein a locking gear is engaged with the teeth of one of said first and second components for rotation thereby, and is movable into a position where it also engages with the teeth of the other of said first and second components to prevent relative movement between the first and second components. The component with which the locking gear is always engaged during use is typically also a rotatable gear, while the other component may be a rotatable gear, a toothed rack or other toothed component.

Alternative embodiments of the locking apparatus may use more complex gear trains than those described herein, e.g. more than one driven gear and/or more than one locking gear, or a gear train in place of any one or more of the aforementioned single gears.

The invention is not limited to the embodiments described herein, which may be modified or varied without departing from the scope of the invention.

The invention claimed is:

1. A vehicle seat having a carriage that is linearly movable with respect to a base, and a locking apparatus comprising a first and a second component, each having a respective set of teeth that inter-engage such that, during movement of the carriage with respect to the base, one of said first and second toothed components imparts movement to the other via the respective teeth, the locking apparatus further comprising a locking gear movable into a locking state where it engages with the teeth of said second component to prevent relative movement between the first and second components,
    wherein said carriage is linearly movable with respect to said base along a first axis corresponding to a fore-and-aft direction of a seated, said locking gear being responsive to a force in a first direction along said first axis above a threshold level to move from a non-locking state into said locking state, and
    wherein said force is created in use by deceleration of said vehicle seat.

2. A vehicle seat as claimed in claim 1, wherein said locking apparatus is configured such that said locking gear adopts a non-locking state under the influence of gravity.

3. A vehicle seat as claimed in claim 1, wherein the first component comprises a rotatable gear, the second component comprising a rotatable gear, or a toothed rack or other toothed component.

4. A vehicle seat as claimed in claim 1, wherein said carriage and said base are coupled together by a rack and pinion gear.

5. A vehicle seat as claimed in claim 4, wherein said second toothed component comprises said rack said first toothed component comprises said pinion gear.

6. A vehicle seat as claimed in claim 4, wherein said second toothed component comprises said pinion gear, and said first toothed component comprises a toothed gear intermeshed with both said pinion gear and said locking gear.

7. A vehicle seat as claimed in claim 4, wherein the rack is provided on said carriage and the pinion gear is provided on said base, the pinion gear being rotatable about an axis that is fixed with respect to the base.

8. A vehicle seat as claimed in claim 4, wherein the rack is provided on said base and the corresponding pinion gear is provided on said carriage, the pinion gear being rotatable about an axis that is fixed with respect to the carriage.

9. A vehicle seat as claimed in claim 4, wherein the locking apparatus comprises a first gear coupled to the pinion gear such that the first gear and pinion gear rotate, in use, in opposite senses, said locking gear being coupled to said first gear such that the locking gear and the first gear rotate, in use, in opposite senses, wherein the locking gear is movable between a non-locking state, in which it is disengaged from the pinion gear, and a locking state in which it intermeshes with the pinion gear to prevent rotation of the pinion gear.

10. A vehicle seat as claimed in claim 6, wherein the rack is provided on the carriage, said first gear being rotatable about an axis that is fixed with respect to the base, or the rack is provided on the base, said first gear being rotatable about an axis that is fixed with respect to the carriage.

11. A vehicle seat as claimed in claim 4, wherein the locking apparatus comprises a first gear coupled to the pinion gear such that the first gear and pinion gear rotate, in use, in opposite senses, and, wherein said first gear intermeshes with said pinion gear.

12. A vehicle seat as claimed in claim 11, wherein said locking gear intermeshes with said first gear.

13. A vehicle seat as claimed in claim 4, wherein the locking gear and its pivot axis are positioned below the pinion gear, the locking gear being arranged to adopt a non-locking state under the influence of gravity.

14. A vehicle seat as claimed in claim 4, wherein the locking apparatus comprises a first gear coupled to the pinion gear such that the first gear and pinion gear rotate, in use, in opposite senses, and wherein said carriage is linearly movable with respect to said base along a first axis corresponding to a fore-and-aft direction of a seated passenger, the first gear being located below and aft of the pinion gear.

15. A vehicle seat as claimed in claim 14, wherein the locking gear is located below and forwardly of the first gear.

16. A vehicle seat as claimed in claim 4, wherein the locking apparatus comprises a first gear coupled to the pinion gear such that the first gear and pinion gear rotate, in use, in opposite senses, and wherein either the first gear or the pinion gear is directly or indirectly coupled to the output shaft of a rotary actuator.

17. A vehicle seat as claimed in claim 1, wherein resilient biasing means are coupled between said locking gear and either said base or said carriage, said biasing means being arranged to maintain the locking gear in said locking state.

18. A vehicle seat as claimed in claim 17, wherein said biasing means is arranged to urge the locking gear into said locking state.

19. A vehicle seat as claimed in claim 17, wherein said resilient biasing means is arranged to maintain said locking gear in the non-locking state, said biasing means being selected to exert a bias that is overcome in the event of said threshold force.

20. A vehicle seat as claimed in claim 1, wherein the seat is reclinable, said relative linear movement of the carriage and base corresponding to the seat being operated between reclined and non-reclined states.

21. A vehicle seat as claimed in claim 1, wherein the seat is movable forward and rearwards, said relative linear movement of the carriage and base corresponding to the seat being moved forward and rearward.

22. A vehicle seat as claimed in claim 1, wherein said locking gear is engaged with the teeth of said first component for rotation thereby.

23. A vehicle seat having a carriage that is linearly movable with respect to a base, and a locking apparatus comprising a first and a second component, each having a respective set of teeth that inter-engage such that, during movement of the carriage with respect to the base, one of said first and second toothed components imparts movement to the other via the respective teeth, the locking apparatus further comprising a locking gear movable into a locking state where it engages with the teeth of said second component to prevent relative movement between the first and second components, wherein said carriage is linearly movable with respect to said base along a first axis corresponding to a fore-and-aft direction of a seated passenger, said locking gear being responsive to a force in a first direction along said first axis above a threshold level to move from a non-locking state into said locking state, and wherein said force is created in use by acceleration of said vehicle seat.

24. A vehicle seat having a carriage that is linearly movable with respect to a base, and a locking apparatus comprising a first and a second component, each having a respective set of teeth that inter-engage such that, during movement of the carriage with respect to the base, one of said first and second toothed components imparts movement to the other via the respective teeth, the locking apparatus further comprising a locking gear movable into a locking state where it engages with the teeth of said second component to prevent relative movement between the first and second components, wherein said locking gear is pivotably movable into said locking state.

25. A vehicle seat as claimed in claim 24, wherein said locking gear is coupled to the locking apparatus by a link member, the locking gear being rotatably coupled to the link member and the link member being pivotable with respect to the locking apparatus to allow the locking gear to pivot between the locking state and a non-locking state.

26. A vehicle seat as claimed in claim 15, wherein the locking apparatus includes a first gear, wherein the link member couples the first gear directly to the locking gear, maintaining the intermeshing of the respective gears, and is pivotable about the rotational axis of the first gear.

27. A vehicle seat as claimed in claim 25, wherein the link member is configured to have a centre of gravity positioned such that the mass of the link member tends to cause a moment under gravity about the pivot axis of the link member that has an opposite sense to the moment caused by the mass of the locking gear under gravity.

* * * * *